(12) United States Patent
Iwabuchi et al.

(10) Patent No.: US 8,727,422 B2
(45) Date of Patent: May 20, 2014

(54) BACK DOOR FOR AUTOMOBILE (75) Inventors: Masayoshi Iwabuchi, Chikusei (JP); Shigeo Suzuki, Chikusei (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/468,020

(22) Filed: May 9, 2012

(65) Prior Publication Data
US 2012/0286538 A1 Nov. 15, 2012

(30) Foreign Application Priority Data

May 13, 2011 (JP) ................................ P2011-108229

(51) Int. Cl.
*B60J 5/10* (2006.01)

(52) U.S. Cl.
USPC ........................................ 296/146.8; 296/106

(58) Field of Classification Search
USPC ..................... 296/146.8, 56, 106, 146.11, 202
See application file for complete search history.

(56) References Cited

U.S. PATENT DOCUMENTS

| 4,822,098 | A | * | 4/1989 | Vogt et al. | 296/146.5 |
| 4,941,769 | A | * | 7/1990 | Natsume | 403/408.1 |
| 7,690,715 | B2 | * | 4/2010 | Hakamata et al. | 296/106 |
| 8,403,399 | B2 | * | 3/2013 | Kuntze et al. | 296/146.8 |
| 2009/0294196 | A1 | * | 12/2009 | Stahl | 180/69.21 |

FOREIGN PATENT DOCUMENTS

| JP | 2001-206062 | | 7/2001 |
| JP | 2004-075018 | | 3/2004 |
| JP | 2007-030600 | | 2/2007 |
| JP | 201157188 | * | 3/2011 |

* cited by examiner

*Primary Examiner* — Dennis H Pedder
(74) *Attorney, Agent, or Firm* — Miles & Stockbridge P.C.

(57) ABSTRACT

The present invention provides a back door for an automobile including an inner panel and an outer panel made of resin. A pair of reinforcement metal plates is disposed on an inner wall of the inner panel at end portions in a left-to-right direction of a space formed between the inner panel and the outer panel integrated together. The reinforcement metal plates each include a damper attachment portion to which a damper-connecting member connected to a damper is attached, and a hinge attachment portion to which a hinge extending toward a car body is fixed.

18 Claims, 8 Drawing Sheets

Fig.8

BACK DOOR FOR AUTOMOBILE

BACKGROUND OF THE INVENTION

1. Field of the Invention

The present invention relates to a back door for an automobile.

2. Related Background Art

Weight reduction of automotive parts has recently been demanded for the purpose of improving fuel efficiency of automobiles and for reducing environmental loads. There are an increasing number of cases where structural materials of the parts are changed from metal to resin for weight reduction. Resin back door members have also been introduced. To ensure strength, resin back doors are known to be formed by press-molding glass mats (for example, see Japanese Patent Application Laid-Open Publication No. 2001-206062). A method of molding a back door by injection molding using a thermoplastic resin containing long fiber is also disclosed (see Japanese Patent Application Laid-Open Publication No. 2007-30600).

Resin inner panels of automotive back doors are advantageous in that the specific rigidity is higher than that of steel plate products (lighter than steel plate products in terms of flexural rigidity), that a complex shape that is difficult to form with sheet metal in steel plate products can be formed relatively easily, and that they are suitable for small-batch production because their molds are cheap although the product cost is high.

Figure 7:
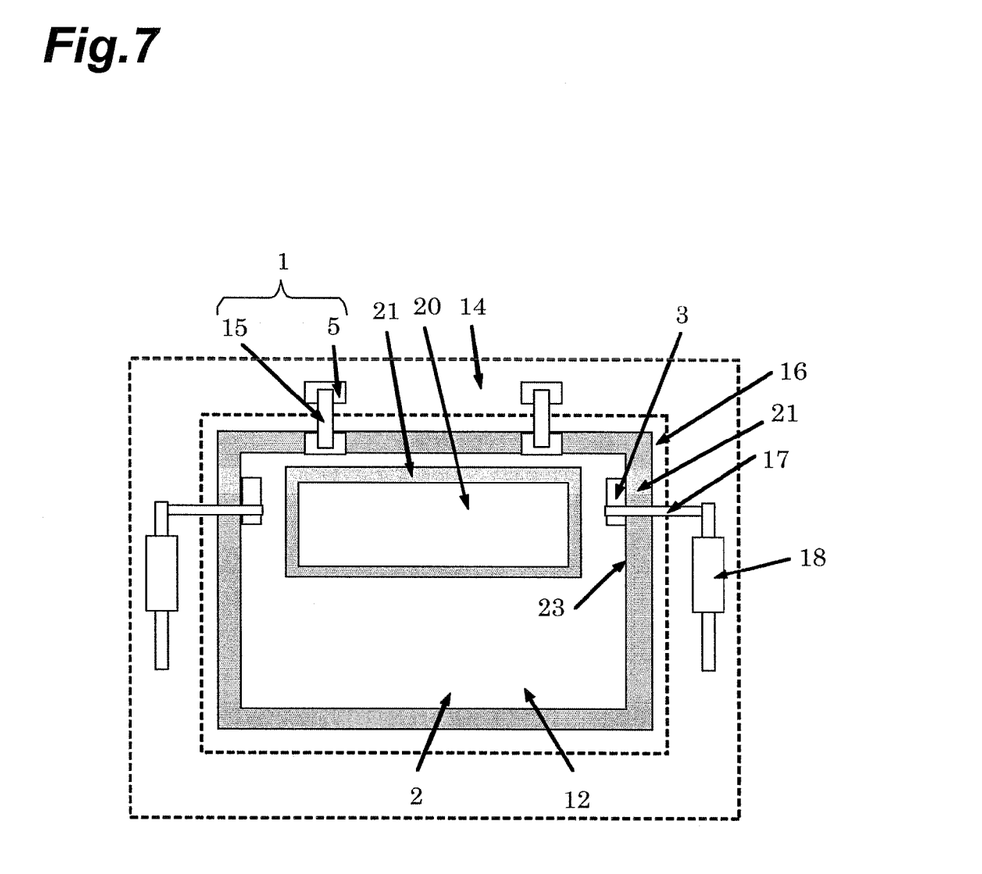
FIG. 7 is a schematic diagram of a plan view depicting an internal structure of a conventional back door.

A resin back door is generally fixed to a car body with a hinge mounted at an upper portion thereof and a lock set at the center of a lower portion thereof. Dampers for holding the back door being open and for assisting in opening/closing the door are set at both sides. Force on the damper is directly exerted on the back door and may cause the back door to be deformed because the damper set position and the hinge attachment position are set apart from each other. More specifically, as shown in FIG. 7, an attachment position of a member (a stud ball 17) for connecting a damper 18 and an attachment position of a hinge 1 are provided away from each other in an inner panel 2 which is a resin molded product. Therefore, when the back door is open, the force from the hinge and the damper acts on points apart from each other through the back door itself. As a result, the back door, if not having sufficient rigidity, may be deformed. In order to overcome this problem, a metal reinforcement member may be attached on the entire back door. However, this method may involve mass increase and cost increase. As another method, a material having rigidity as high as a steel plate may be used as the material of the inner panel. However, in this method, the flexibility in shape may be impaired.

SUMMARY OF THE INVENTION

The present invention is made in view of such situations and is intended to provide a back door for an automobile in which deformation of the door by a damper is prevented with increased flexibility in shape (design) while preventing mass increase and cost increase.

A back door for an automobile according to an aspect of the present invention is as follows.

(1) A back door for an automobile includes an inner panel made of resin and an outer panel made of resin. A pair of reinforcement metal plates is disposed on an inner wall of the inner panel at end portions in a left-to-right direction of a space formed between the inner panel and the outer panel integrated together. The reinforcement metal plates each include a damper attachment portion to which a damper-connecting member connected to a damper is attached, and a hinge attachment portion to which a hinge extending toward a car body is fixed.

(2) In the back door for an automobile in (1) above, the damper-connecting member is a metal part fitted in a damper.

(3) In the back door for an automobile in (1) above, the damper-connecting member is a stud ball.

(4) In the back door for an automobile in (1) above, each of the reinforcement metal plates is disposed at a joint surface region of the inner panel and the outer panel, and disposed on the inner wall of the inner panel having an outer wall in abutment with a seal member on the car body.

(5) In the back door for an automobile in (1) or (4) above, a first metal ring is placed in a first prepared hole provided in the inner panel, and a bolt is joined with the hinge attachment portion through a hinge attachment hole of the hinge and the first metal ring and is installed in the first prepared hole, whereby the hinge is attached to the inner panel.

(6) In the back door for an automobile in (5) above, a nut portion in which the bolt is screwed is provided in the hinge attachment portion.

(7) In the back door for an automobile in (1) or (4) above, the reinforcement metal plate is placed on a vertical plane formed on the inner panel.

(8) In the back door for an automobile in (1) or (4) above, a second metal ring is placed in a second prepared hole provided in the inner panel, and the damper-connecting member is joined with the damper attachment portion through the second metal ring and is installed in the second prepared hole.

(9) In the back door for an automobile in (1) or (4) above, the reinforcement metal plate includes a wire engagement portion.

The present invention provides a back door for an automobile in which deformation of the door by a damper is prevented with improved design while preventing mass increase and cost increase.

DESCRIPTION OF THE PREFERRED EMBODIMENTS

A back door for an automobile includes an inner panel made of resin and an outer panel made of resin. A pair of reinforcement metal plates is disposed on an inner wall of the inner panel at end portions in the left-to-right direction of a space formed between the inner panel and the outer panel integrated together. The reinforcement metal plates each have a stud ball attachment portion for attaching a stud ball passing through the inner panel from the space and protruding outward to be fitted in a damper (a damper attachment portion to which a damper-connecting member connected to a damper is attached), and a hinge attachment portion for fixing a hinge extending toward a car body side.

The back door refers to a door disposed at the rear of a body of an automobile. The back door is fixed using a hinge at the rear of the automobile so as to be able to open/closed. The back door is configured by integrating an inner panel and an outer panel affixed together. The back door generally has an opening in which glass is fitted. Glass is installed in the outer panel side so as to close the opening.

The outer panel refers to an automotive exterior part in a configuration of the back door. The inner panel refers to an automotive interior part in a configuration of the back door. The inner panel and the outer panel made of resin for use in the present invention are usually produced by press-molding using a polypropylene resin material containing glass fiber. However, the resin material and the molding conditions are not specifically limited.

The space refers to a space formed between the inner panel and the outer panel integrated together. The inner panel and the outer panel each have a joint surface for joining each other. The inner panel and the outer panel are integrated together by joining the joint surfaces with each other. The outer panel and the inner panel can be joined with a urethane adhesive or the like. The joint surfaces are formed, for example, by lifting mainly the end portions of the inner panel and the outer panel in the vertical direction. The lifted end surfaces serve as the joint surfaces. A joint surface region refers to a region serving as the joint surfaces as two-dimensionally viewed. The end portion in the left-to-right direction of the space refers to a portion of the joint surface region that faces the space, that is, a portion that is an inner wall of the inner panel.

The reinforcement metal plate reinforces the inner panel at a place where the stud ball and the hinge are attached. The reinforcement metal plate has through holes for fixing the stud ball and the hinge, for example, with bolts. The through hole may be a nut portion having a thread groove into which a bolt or the like is screwed.

The reinforcement metal plate has a stud ball attachment portion to which a stud ball for connecting a damper is attached, and a hinge attachment portion to which a hinge extending toward a car body side is fixed. In this manner, the stud ball attachment portion for connecting a damper and the hinge attachment portion for fixing a hinge are integrally formed into a common member. Therefore, both load of supporting the damper and load of supporting the hinge act on the integrally formed single member without through the back door that is a resin molded product. Therefore, the back door that is a resin molded product can be prevented from being deformed under the load of supporting the damper and the load of supporting the hinge. This eliminates the need for reinforcing the entire back door with a reinforcement member, thereby increasing the flexibility in shape (design) and preventing mass increase and cost increase.

The stud ball refers to a metal part for connecting a damper and is, for example, a ball joint having a portion fitted in one end of a damper. For this reason, the stud ball is also referred to as a metal part fitted in a damper. For example, one end of the stud ball is attached to the reinforcement metal plate disposed on the inner wall of the inner panel, and the other end of the stud ball is provided so as to pass through the inner panel from the space and protrude outward. The other end that protrudes outward is disposed so as to have a portion fitted in one end of the damper. The damper is used for holding the back door being open and for assisting in opening/closing the back door.

The hinge attachment portion refers to a portion for attaching the hinge extending toward the car body side to the reinforcement metal plate attached to the inner panel. The hinge attachment portion is formed of, for example, a through hole for fixing a bolt with a nut or the like. The through hole may be a nut portion having a thread groove in which a bolt or the like is screwed. It is preferable that the nut portion should be formed by fixing a nut to the reinforcement metal plate by welding or the like because there is no need for working of forming a thread groove in the through hole of the reinforcement metal plate per se, and thus deformation of the reinforcement metal plate due to the effect of the working can be prevented. The hinge refers to a hinge for joining the back door with the body of an automobile. The hinge has one end attached to each of the left and right ends at the rear of the car body to which the back door is attached and has the other end attached to the inner panel. An example of the hinge has a car body-hinge fixing portion for fixing to the car body, a hinge arm pivotably attached to the car body-hinge fixing portion, and a hinge attachment hole (through hole) for fixing the hinge arm to the inner panel of the back door.

Preferably, the reinforcement metal plate is disposed at the joint surface region of the inner panel and the outer panel, on the inner wall of the inner panel having an outer wall in abutment with a seal member on the car body. In other words, it is preferable that the reinforcement metal plate should be disposed on the inner wall side of the inner panel wall that rises approximately vertically toward the joint surface region. The car body seal member is provided to surround the opening at the rear of the car body where the back door is attached, for sealing the gap between the car body and the inner panel of the back door. In other words, the place in the inner panel where the outer wall abuts on the seal member is a region that is the end portion in the left-to-right direction of the inner panel as a whole. Therefore, at the joint surface region, the inner wall of the inner panel at the place where the outer wall abuts on the seal member is a region that is the end portion in the left-to-right direction of the inner panel as a whole. The damper set positions on the car body side are at left and right ends of the opening at the rear of the car body. Therefore, the reinforcement metal plate is disposed on the inner panel at a position closer to the damper set position, and the hinge attached to the reinforcement metal plate is also disposed closer to the damper. Thus, the damper set position comes closer to the position of the hinge, so that the hinge attachment portion and the stud ball attachment portion for connecting the damper can be easily provided in the reinforcement metal plate. In addition, the size of the reinforcement metal plate can be reduced, and the weight of the back door as a whole can be reduced accordingly. Preferably, the attachment position of the reinforcement metal plate is at an upper portion of the end portion in the left-to-right direction of the inner panel at the time of attachment to the car body.

Preferably, a metal ring (first metal ring) is placed in a prepared hole (first prepared hole) provided in the inner panel, and a nut portion provided in the reinforcement metal plate and a hinge attachment hole provided in the hinge are joined together with a bolt through the metal ring (first metal ring) to be installed at the prepared hole (first prepared hole). The hinge is thus attached to the inner panel. Preferably, a separation distance is provided between the bolt and the prepared hole (first prepared hole) of the inner panel. In order to do so, preferably, a prepared hole (first prepared hole) is provided to allow the bolt to pass through the inner panel, and a metal ring (first metal ring) is placed in alignment with the prepared hole (first prepared hole) so as to protrude inward and outward of the inner panel. The bolt is joined with the hinge attachment hole of the hinge and the nut portion provided in the reinforcement metal plate through the metal ring (first metal ring). In this case, a separation distance is present between the bolt and the inner panel because of the thickness of the hinge and the metal ring. Thus, the inner panel can be protected because the inner panel and the hinge are not in direct contact with each other. The metal ring (first metal ring) is formed in a tubular shape longer than the depth of the prepared hole (first prepared hole), that is, a tubular shape longer than the thickness of the wall of the inner panel in which the metal ring (first metal ring) is placed, and the metal ring (first metal ring) is disposed so as to protrude toward the inner wall side and the outer wall side of the inner panel. In this manner, the bolt, the hinge, the metal ring (first metal ring), and the reinforcement metal plate are installed at the prepared hole (first prepared hole) of the inner panel in a state in which all these metals are in abutment with each other (metal touch). As a result, secure installation can be achieved. Here, the metal ring (first metal ring) may be formed in a tubular shape having a length equivalent to the depth of the prepared hole (first prepared hole), that is, a tubular shape having a length equivalent to the thickness of the wall of the inner panel in which the metal ring (first metal ring) is placed, and the metal ring (first metal ring) may be disposed so as to be flush with the surfaces on the outer wall side and the inner wall side of the inner panel.

Also in this case, damage to the inner panel due to direct contact between the inner panel and the hinge is also suppressed, and the bolt, the hinge, the metal ring (first metal ring), and the reinforcement metal plate are installed at the prepared hole (first prepared hole) of the inner panel in a state in which all these metals are in abutment with each other (metal touch).

Figure 4:
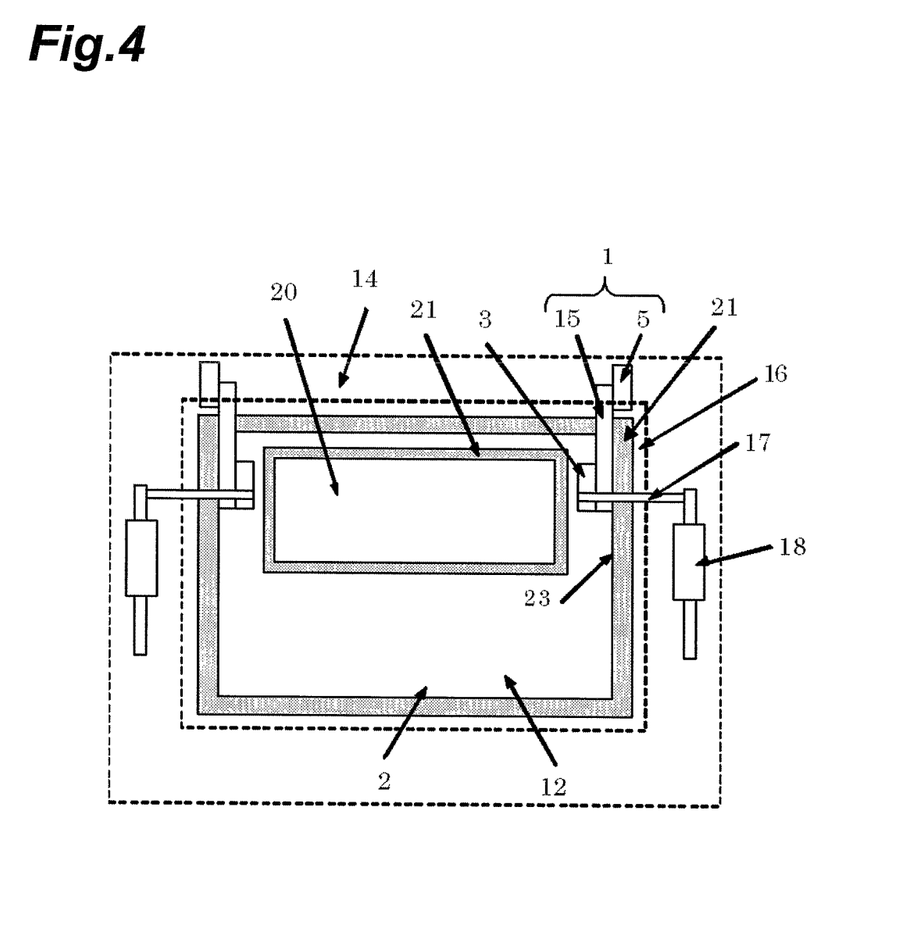
FIG. 4 is a schematic diagram of a plan view depicting an exemplary internal structure of the back door according to the embodiment.
Figure 5:
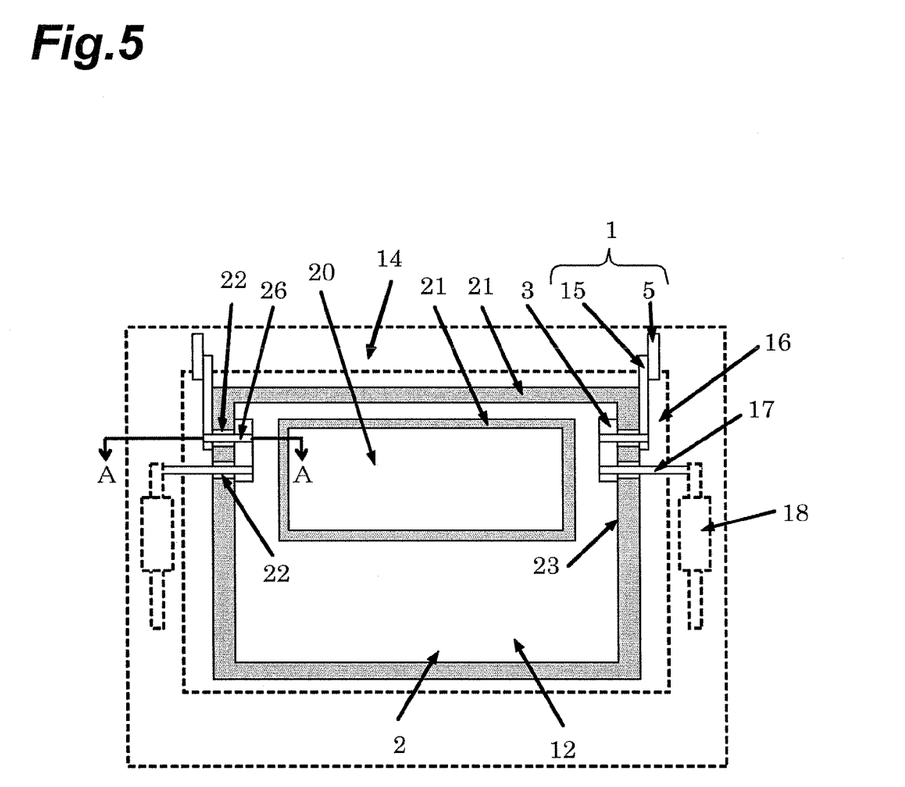
FIG. 5 is a schematic diagram of a plan view depicting an exemplary internal structure of the back door according to the embodiment.

Preferably, the reinforcement metal plate is placed on a vertical plane that is formed on the inner panel. The vertical plane refers to a plane that rises in the vertical direction when the inner panel is put on a plane. For example, the vertical plane corresponds to an inner wall 23 on the inside of a joint surface region 21 as shown in FIG. 4 and FIG. 5. Accordingly, reinforcement metal plates 3 can be easily disposed at the left and right ends of the inner panel as a whole, and the reinforcement metal plates 3 each can be disposed close to the damper set position and the position of a hinge 1. The members including the hinge 1, the reinforcement metal plate 3, and the inner panel 2 are provided with through holes so that they can be easily fixed using a bolt 26, a screw, or the like.

Preferably, a metal ring (second metal ring) is placed in a prepared hole (second prepared hole) provided in the inner panel, and the stud ball is installed through the metal ring (second metal ring). More specifically, a prepared hole (second prepared hole) is provided to allow the stud ball to pass through the inner panel, and a metal ring (second metal ring) is placed in the prepared hole (second prepared hole) so as to protrude outward and inward of the inner panel. The stud ball is installed through the metal ring (second metal ring). In this case, a separation distance is present between the stud ball and the inner panel because of the thickness of the metal ring (second metal ring). Thus, the inner panel can be protected because the inner panel and the stud ball are not in direct contact with each other. Furthermore, the metal ring (second metal ring) is formed in a tubular shape longer than the depth of the prepared hole (second prepared hole), that is, a tubular shape longer than the thickness of the inner panel wall in which the metal ring (second metal ring) is placed, and the metal ring (second metal ring) is disposed so as to protrude toward the inner wall side and the outer wall side of the inner panel. In this manner, the stud ball, the metal ring (second metal ring), and the reinforcement metal plate are installed at the prepared hole (second prepared hole) of the inner panel in a state in which all these metals are in abutment with each other (metal touch). Thus, secure installation can be achieved. Here, the metal ring (second metal ring) may be formed in a tubular shape having a length equivalent to the depth of the prepared hole (second prepared hole), that is, a tubular shape having a length equivalent to the thickness of the inner panel wall in which the metal ring (second metal ring) is placed, and the metal ring (second metal ring) may be disposed so as to be flush with the surfaces on the outer wall side and the inner wall side of the inner panel. Also in this case, damage to the inner panel due to direct contact between the inner panel and the stud ball is suppressed, and the stud ball, the metal ring (second metal ring), and the reinforcement metal plate are installed at the prepared hole (second prepared hole) of the inner panel in a state in which all these metals are in abutment with each other (metal touch).

Preferably, the reinforcement metal plate has a wire engagement portion. The wire engagement portion (wire attachment portion) is a part that fixes a wire for preventing separation in case of a crash at the back. The hinge and the lock (for fixing the back door to the lower portion of the car body) are coupled with a metal wire or any equivalent having the same strength so that the back door is never separated from the car body.

The hinge attachment position in the back door is changed from a position corresponding to the upper portion of the car body to a position corresponding to the left and right ends, so that the force applied on the back door per se is applied to the vehicle body. Therefore, the inner panel and the outer panel can be reduced in thickness. In addition, since the strength is not sought, ribs can be reduced, and sink marks which would be caused by providing ribs can be minimized. Moreover, the reduction in thickness can reduce the amount of resin used.

The present invention is not limited to the present embodiment and is susceptible to various other embodiments within the scope not departing from the spirit of the present invention.

Example 1

An example of the present invention will be described below based on the drawings. However, the present invention is not limited to the example below.

Figure 1:
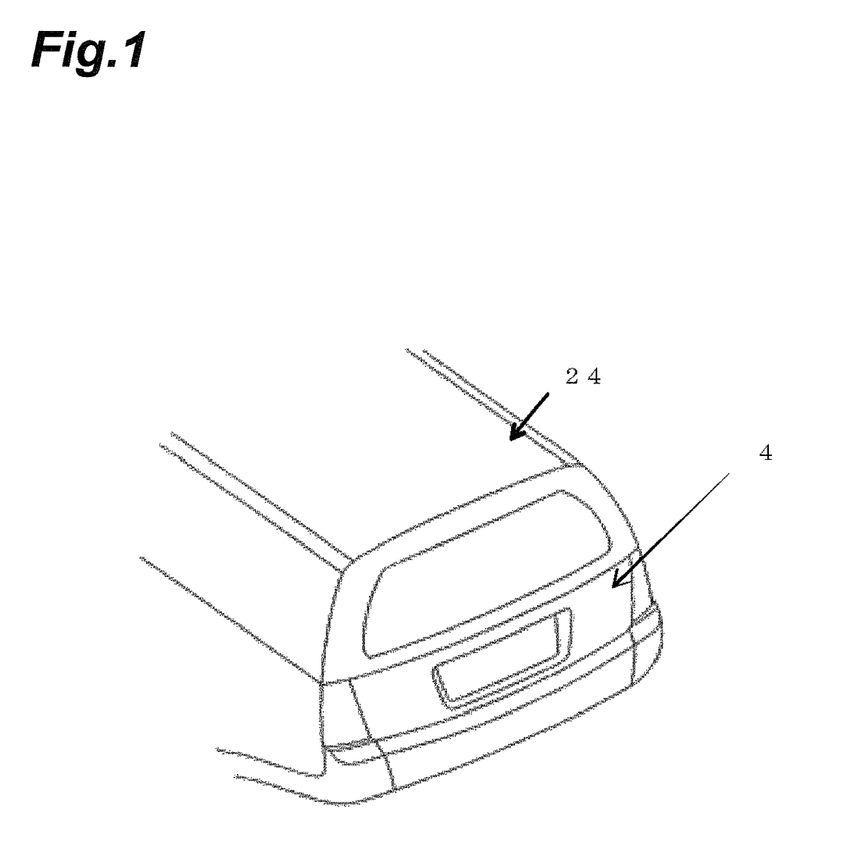
FIG. 1 is an external view of a back door.
Figure 2:
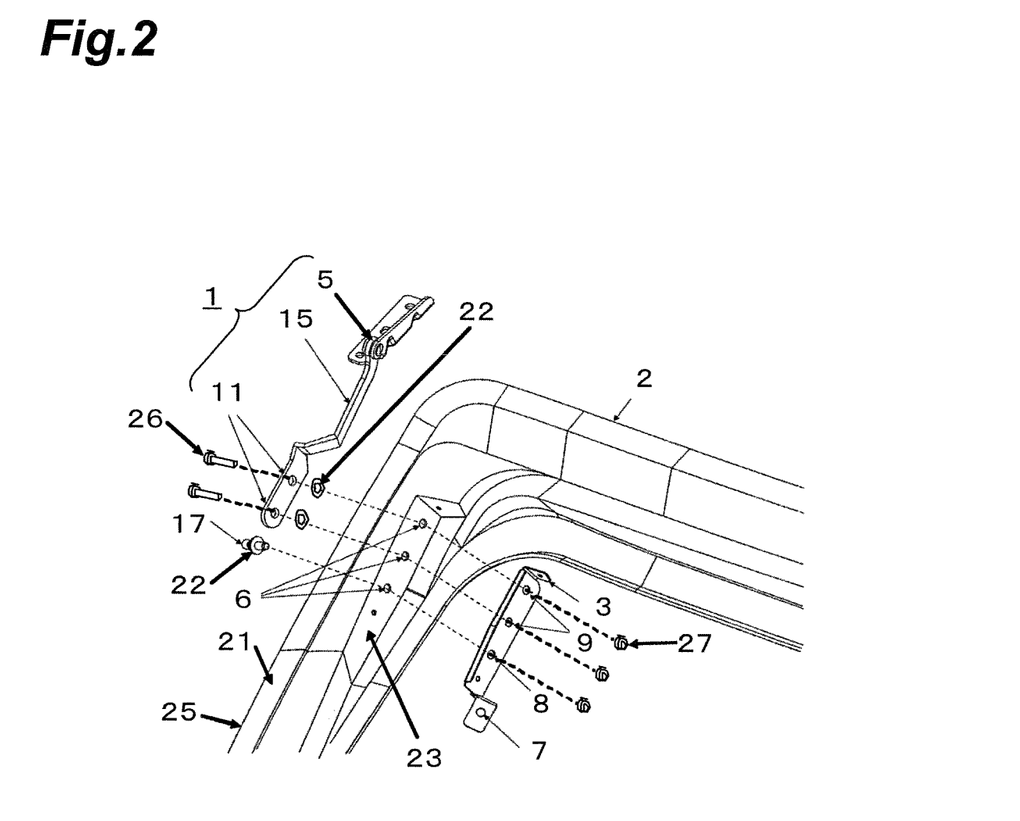
FIG. 2 is an exploded view of components of the back door according to an embodiment.

FIG. 1 shows a back door 4 mounted on the rear of a wagon. FIG. 2 is an exploded view of components of the back door. A hinge 1 is provided outside a surface 25 of an inner panel 2 that is in contact with a seal member on a car body. The inner panel 2 is molded from a polypropylene resin material containing glass fiber. The back door has a reinforcement metal plate 3 on the inside of the inner panel 2. A stud ball 17, which is a metal part fitted in a damper, is fastened to the same reinforcement metal plate 3 through a metal ring 22, in a similar manner as the hinge 1.

As shown in FIG. 2, the reinforcement metal plate 3 has a hinge attachment portion 9, a wire attachment portion (wire engagement portion) 7, and a stud ball attachment portion 8. A metal ring attachment hole (prepared hole) 6 is provided in the inner panel 2. The hinge 1 has a hinge arm 15 having a hinge attachment hole (through hole) 11 at one end and having a car body-hinge fixing portion 5 at the other end to be fixed to the car body. In FIG. 2, the broken lines show the attachment positions of the hinge 1 (hinge arm 15) and the reinforcement metal plate 3. Then, the hinge attachment hole (through hole) 11 of the hinge arm 15 is joined with a nut portion provided in the reinforcement metal plate 3 with a bolt 26.

Figure 3:
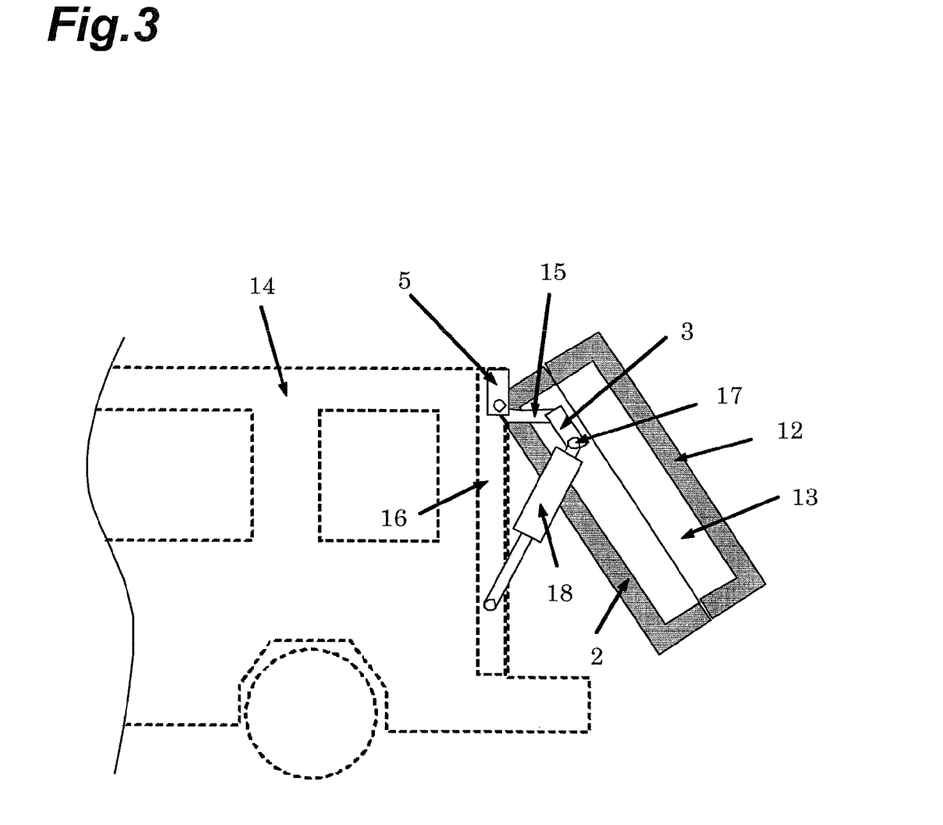
FIG. 3 is a schematic diagram of a side view of the back door according to the embodiment.

As shown in FIG. 3, a space 13 is formed between the inner panel 2 and the outer panel. The hinge arm 15 and the stud ball 17 are joined with the reinforcement metal plate 3. The reinforcement metal plate 3 is disposed in the space 13. The stud ball 17 is fitted in a damper 18. The hinge arm 15 is fixed to a car body 14 through the car body-hinge fixing portion 5.

As shown in FIG. 4 and FIG. 5, the reinforcement metal plate 3 is disposed on the inside (an inner wall 23) of a joint surface region 21 of the inner panel 2 and the outer panel 12, the outside of which abuts on a seal member 16 on the car body. The reinforcement metal plate 3 joined with the hinge arm 15 and the stud ball 17 is located on the inner wall 23 at each of the end portions in the left-to-right direction of the inner panel 2. Therefore, the position where the damper 18 is set and the position where the hinge arm 15 is attached are close to each other and provided in the common reinforcement metal plate 3 integrally formed. Accordingly, the force of the damper 18 is not directly applied to the back door, and the back door does not become deformed.

Figure 6:
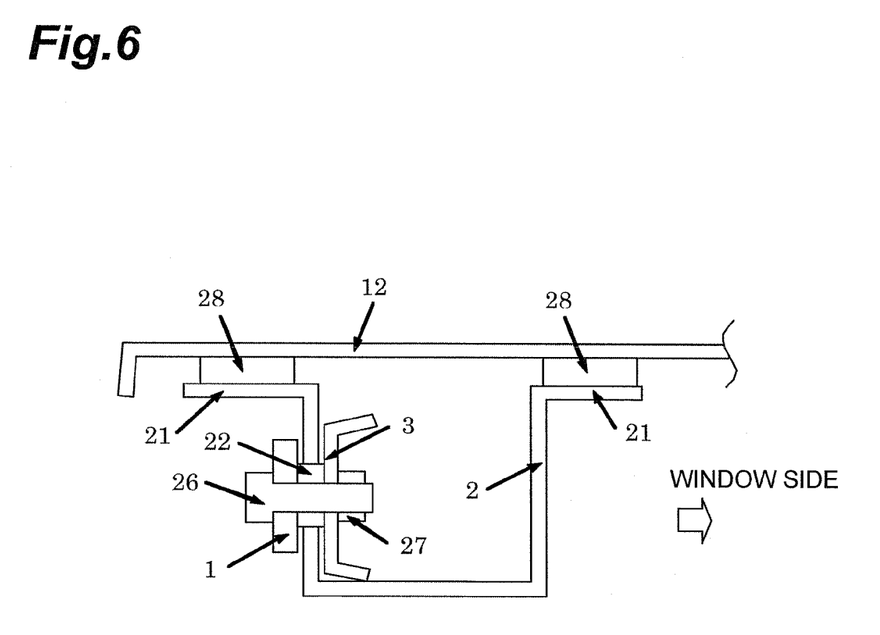
FIG. 6 is a cross-sectional view along A-A in FIG. 5.
Figure 8:
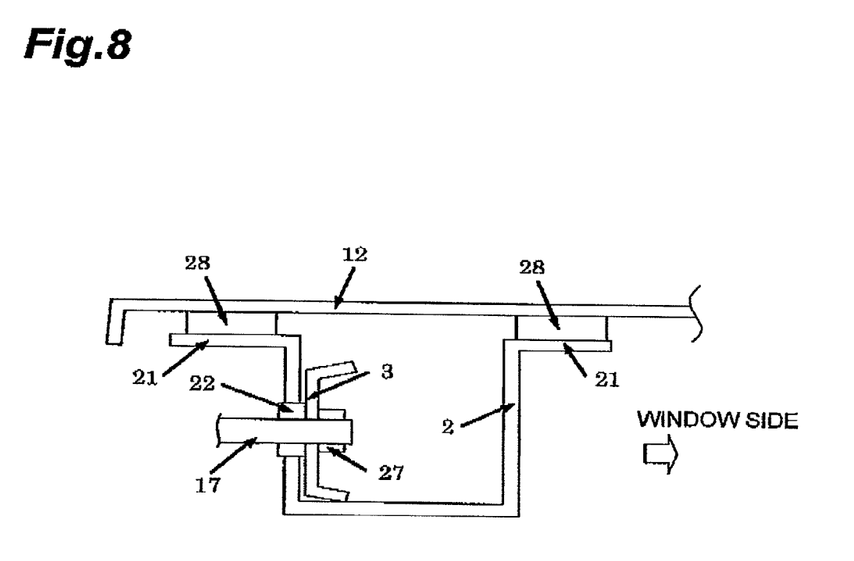
FIG. 8 is a cross-sectional view similar to FIG. 6 but depicting another portion of the internal structure.

As shown in FIG. 6, the inner panel 2 has a prepared hole (first prepared hole) through which the bolt 26 is passed. A metal ring 22 (first metal ring) is placed in alignment with the prepared hole (first prepared hole) so as to protrude outward and inward of the inner panel 2. The bolt 26 is joined with the hinge attachment hole of the hinge 1 and a nut portion 27 provided in the reinforcement metal plate 3 through the metal ring 22 (first metal ring). Therefore, a separation distance is present between the bolt 26 and the inner panel 2 because of the thickness of the hinge 1 and the metal ring 22 (first metal ring). Thus, the inner panel 2 can be protected because the inner panel 2 and the hinge 1 are not in direct contact with each other. As shown in FIG. 8, a prepared hole (second prepared hole) is provided to allow the stud ball 17 to pass through the inner panel, and a metal ring 22 (second metal ring) is placed in the prepared hole (second prepared hole) so as to protrude outward and inward of the inner panel 2. The stud ball 17 is installed through this metal ring (second metal ring). Therefore, a separation distance is present between the stud ball and the inner panel because of the thickness of the metal ring (second metal ring). Thus, the inner panel can be protected because the inner panel and the stud ball are not in direct contact with each other.

The back door of the present invention was produced in which the hinge attachment position was located at each of the end portions in the left-to-right direction. A back door (FIG. 7) reinforced with a metal member was produced as a comparative example in which the hinge attachment position was located in the upper portion. The masses and costs of those back doors were compared. In this comparison, the mass of the back door of the present invention was 9.8 kg, whereas the mass of the comparative example was 13.5 kg. The cost (index) of the back door of the present invention was 100, whereas the cost (index) of the comparative example was 130. In the back door of the present invention in this manner, the hinge attachment position is changed from the upper portion of the inner panel to the left and right end portions, whereby mass increase and cost increase can be reduced as compared with the conventional automotive back door. Neither deformation of the door by the damper nor sink marks due to the ribs was observed.

DESCRIPTION OF REFERENCE NUMERALS

1 hinge, 2 inner panel, 3 reinforcement metal plate, 4 back door, 5 car body-hinge fixing portion, 6 metal ring attachment hole (prepared hole), 7 wire attachment portion (wire engagement portion), 8 stud ball attachment portion, 9 hinge attachment portion, 11 hinge attachment hole (through hole), 12 outer panel, 13 space, 14 car body, 15 hinge arm, 16 seal member (on the car body), 17 stud ball, 18 damper, 20 window, 21 joint surface region (of the inner panel and the outer panel), 22 metal ring, 23 inner wall (of the inner panel), 24 automobile or car body, 25 surface in contact with the seal member on the car body, 26 bolt, 27 nut, 28 adhesive.

What is claimed is:

1. A back door for an automobile, the back door comprising:
    an inner panel made of resin; and
    an outer panel made of resin, wherein
    a pair of reinforcement metal plates is disposed on an inner wall of the inner panel at end portions in a left-to-right direction of a space formed between the inner panel and the outer panel integrated together, and
    the reinforcement metal plates each include a damper attachment portion to which a damper-connecting member connected to a damper is attached and a hinge attachment portion to which a hinge extending toward a car body is fixed, the damper attachment portion being separate from the hinge attachment portion,
    wherein the damper connecting member is directly connected to a corresponding reinforcement metal plate, and is not directly connected to the hinge.

2. The back door for an automobile according to claim 1, wherein the damper-connecting member is a metal part fitted in a damper.

3. The back door for an automobile according to claim 1, wherein the damper-connecting member is a stud ball.

4. The back door for an automobile according to claim 1, wherein each of the reinforcement metal plates is disposed at a joint surface region of the inner panel and the outer panel, and disposed on the inner wall of the inner panel having an outer wall in abutment with a seal member on the car body.

5. The back door for an automobile according to claim 1, wherein a first metal ring is placed in a first prepared hole provided in the inner panel, and a bolt is joined with the hinge attachment portion through a hinge attachment hole of the hinge and the first metal ring and is installed in the first prepared hole so that the hinge is attached to the inner panel.

6. The back door for an automobile according to claim 5, wherein a nut portion in which the bolt is screwed is provided in the hinge attachment portion.

7. The back door for an automobile according to claim 1, wherein each reinforcement metal plate is placed on a vertical plane formed on the inner panel.

8. The back door for an automobile according to claim 5, wherein a second metal ring is placed in a second prepared hole provided in the inner panel, and the damper-connecting member is joined with the damper attachment portion through the second metal ring and is installed in the second prepared hole.

9. The back door for an automobile according to claim 1, wherein the reinforcement metal plate includes a wire engagement portion.

10. The back door for an automobile according to claim 4, wherein a first metal ring is placed in a first prepared hole provided in the inner panel, and a bolt is joined with the hinge attachment portion through a hinge attachment hole of the hinge and the first metal ring and is installed in the first prepared hole so that the hinge is attached to the inner panel.

11. The back door for an automobile according to claim 10, wherein a nut portion in which the bolt is screwed is provided in the hinge attachment portion.

12. The back door for an automobile according to claim 4, wherein each reinforcement metal plate is placed on a vertical plane formed on the inner panel.

13. The back door for an automobile according to claim 10, wherein a second metal ring is placed in a second prepared hole provided in the inner panel, and the damper-connecting member is joined with the damper attachment portion through the second metal ring and is installed in the second prepared hole.

14. The back door for an automobile according to claim 4, wherein the reinforcement metal plate includes a wire engagement portion.

15. The back door for an automobile according to claim 5, wherein the first metal ring is formed in a tubular shape longer than the depth of the first prepared hole.

16. The back door for an automobile according to claim 8, wherein the second metal ring is formed in a tubular shape longer than the depth of the second prepared hole.

17. The back door for an automobile according to claim 10, wherein the first metal ring is formed in a tubular shape longer than the depth of the first prepared hole.

18. The back door for an automobile according to claim 13, wherein the second metal ring is formed in a tubular shape longer than the depth of the second prepared hole.

* * * * *